(12) United States Patent
Horn

(10) Patent No.: US 8,638,668 B2
(45) Date of Patent: Jan. 28, 2014

(54) SIGNALING IN A CLUSTER

(75) Inventor: Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 599 days.

(21) Appl. No.: 11/696,133

(22) Filed: Apr. 3, 2007

(65) Prior Publication Data
US 2008/0247311 A1 Oct. 9, 2008

(51) Int. Cl.
*G01R 31/08* (2006.01)
(52) U.S. Cl.
USPC .......................................... 370/236
(58) Field of Classification Search
USPC ......... 370/229–235, 389, 401, 410, 522–524; 455/435
See application file for complete search history.

(56) References Cited

U.S. PATENT DOCUMENTS

| 6,230,012 | B1 * | 5/2001 | Willkie et al. ............ 455/435.1 |
| 6,628,655 | B1 * | 9/2003 | Fieschi et al. ................. 370/389 |
| 6,725,044 | B2 | 4/2004 | Verma et al. |
| 7,028,332 | B1 * | 4/2006 | Jason, Jr. .......................... 726/1 |
| 7,043,564 | B1 * | 5/2006 | Cook et al. ..................... 709/246 |
| 7,126,907 | B2 | 10/2006 | Carpini et al. |
| 7,139,268 | B1 | 11/2006 | Bhagwat et al. |
| 7,336,927 | B2 | 2/2008 | Diaz Cervera et al. |
| 7,453,379 | B2 | 11/2008 | Plamondon |
| 7,673,184 | B2 | 3/2010 | Vedanabhatla et al. |
| 2003/0165137 | A1 | 9/2003 | Soloway et al. |
| 2004/0028081 | A1 * | 2/2004 | Chang et al. ................. 370/490 |
| 2005/0101245 | A1 | 5/2005 | Ahmavaara |
| 2005/0135416 | A1 * | 6/2005 | Ketchum et al. ............ 370/469 |
| 2006/0126509 | A1 | 6/2006 | Abi-Nassif et al. |
| 2007/0165622 | A1 * | 7/2007 | O'Rourke et al. ........... 370/389 |
| 2008/0247389 | A1 | 10/2008 | Horn |
| 2010/0069080 | A1 * | 3/2010 | Benveniste ................... 455/450 |

FOREIGN PATENT DOCUMENTS

| CN | 1717070 A | 1/2006 |
| EP | 1613003 | 1/2006 |
| JP | 2004523143 | 7/2004 |
| JP | 2004266516 | 9/2004 |

(Continued)

OTHER PUBLICATIONS

International Search Report—PCT/US2008/059317, International Searching Authority—European Patent Office—Oct. 16, 2008.

(Continued)

*Primary Examiner* — Yemane Mesfin
*Assistant Examiner* — Samina Choudhry
(74) *Attorney, Agent, or Firm* — Dang M. Vo

(57) ABSTRACT

Various techniques for signaling in a cluster are disclosed. The cluster includes a number of nodes that support communications by an apparatus. The apparatus may be configured to support a wireless connection with a first node in the cluster. The apparatus may be further configured to support a first control flow with the first node. The apparatus may be further configured to support a second control flow, through the first node, with a second node in the cluster. The first and second control flows include a plurality of frames each having a field and content, and wherein the field in each of the frames identifies whether the content in that frame is part of the first or second control flow.

37 Claims, 6 Drawing Sheets

(56) References Cited

FOREIGN PATENT DOCUMENTS

| | | |
|---|---|---|
| JP | 2006042337 | 2/2006 |
| JP | 2006325069 A | 11/2006 |
| JP | 2008541575 A | 11/2008 |
| JP | 2008547245 A | 12/2008 |
| TW | I251986 B | 3/2006 |
| WO | WO2006016698 | 2/2006 |

OTHER PUBLICATIONS

Written Opinion—PCT/US2008/059317, International Searching Authority—European Patent Office—10/16/08.

European Search Report—EP08006308—Search Authority—Munich—Oct. 7, 2008.

Taiwan Search Report—TW097112394—TIPO—Jun. 20, 2012.

\* cited by examiner

SIGNALING IN A CLUSTER

BACKGROUND

1. Field

The present disclosure relates generally to telecommunications, and more particularly, to techniques for signaling in a cluster.

2. Background

A wide area network (WAN) is a communications network that covers a large geographic region. Typically, a WAN is used to connect a large number of communication devices together. The largest and most well-known example of a WAN is the Internet.

In contrast to the broad regional coverage of a WAN, a local area network (LAN) is commonly used to connect together a number of communication devices in a limited area, such as a home, office, or public building. Typically, any number of LANs may be connected together through a WAN to enable users in one location to communicate with users in other locations.

Recently, there has been a tremendous growth in the deployment of wireless LANs (WLAN). A WLAN enables users on mobile handsets to move around within a limited coverage region and still remain connected to the LAN. These WLANs have paved the way for more sophisticated mobile handsets, which traditionally had been designed for voice communications. As a result, there is an increasing demand for additional services including e-mail, web-browsing, video broadcasts, etc. The integration of these services into mobile handsets poses various technological challenges for the wireless industry. These challenges include restricted memory capacity and bandwidth considerations, just to name a few. As the wireless industry prepares to meet these challenges, there exists a need for new technology that reduces processing complexity and minimizes the transmission of overhead information through WLANs.

SUMMARY

One aspect of an apparatus for supporting wireless communications in a cluster is disclosed. The apparatus includes a signaling unit configured to support a first control flow with a first node in the cluster. The signaling unit is further configured to support a second control flow, through the first node, with a second node in the cluster. The first and second control flows comprise a plurality of frames each having a field and content, wherein the field in each of the frames identifies whether the content in that frame is part of the first or second control flow.

Another aspect of an apparatus for supporting wireless communications in a cluster is disclosed. The apparatus includes means for supporting a first control flow with a first node in the cluster, and means for supporting a second control flow, through the first node, with a second node in the cluster. The first and second control flows comprise a plurality of frames each having a field and content, wherein the field in each of the frames identifies whether the content in that frame is part of the first or second control flow.

An aspect of a method for communicating in a cluster is disclosed. The method includes supporting a wireless connection with a first node in the cluster, supporting a first control flow with the first node, and supporting a second control flow, through the first node, with a second node in the cluster. The first and second control flows comprise a plurality of frames each having a field and content, wherein the field in each of the frames identifies whether the content in that frame is part of the first or second control flow.

An aspect of an access terminal is disclosed. The access terminal includes a transceiver configured to support a wireless connection with a first node in the cluster, and a signaling unit configured to support a first control flow with the first node. The signaling unit is further configured to support a second control flow, through the first node, with a second node in the cluster, said first and second control flows comprising a plurality of frames each having a field and content, wherein the field in each of the frames identifies whether the content in that frame is part of the first or second control flow.

An aspect of an access point is disclosed. The access terminal includes a transceiver configured to support a wireless connection with a first node in the cluster, and a signaling unit configured to support a first control flow with the first node. The signaling unit is further configured to support a second control flow, through the first node, with a second node in the cluster, said first and second control flows comprising a plurality of frames each having a field and content, wherein the field in each of the frames identifies whether the content in that frame is part of the first or second control flow.

An aspect of a computer program product is disclosed. The computer program product includes computer-readable medium including code executable by at least one computer to support a wireless connection with a first node in a cluster, support a first control flow with the first node, and support a second control flow, through the first node, with a second node in the cluster. The first and second control flows comprise a plurality of frames each having a field and content, wherein the field in each of the frames identifies whether the content in that frame is part of the first or second control flow.

It is understood that other aspects of the invention will become readily apparent to those skilled in the art from the following detailed description, wherein it is shown and described only various aspects of the invention by way of illustration. As will be realized, the invention is capable of other and different configurations and its several details are capable of modification in various other respects, all without departing from the scope of the invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various aspects of the invention and is not intended to represent the only aspects of the invention. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
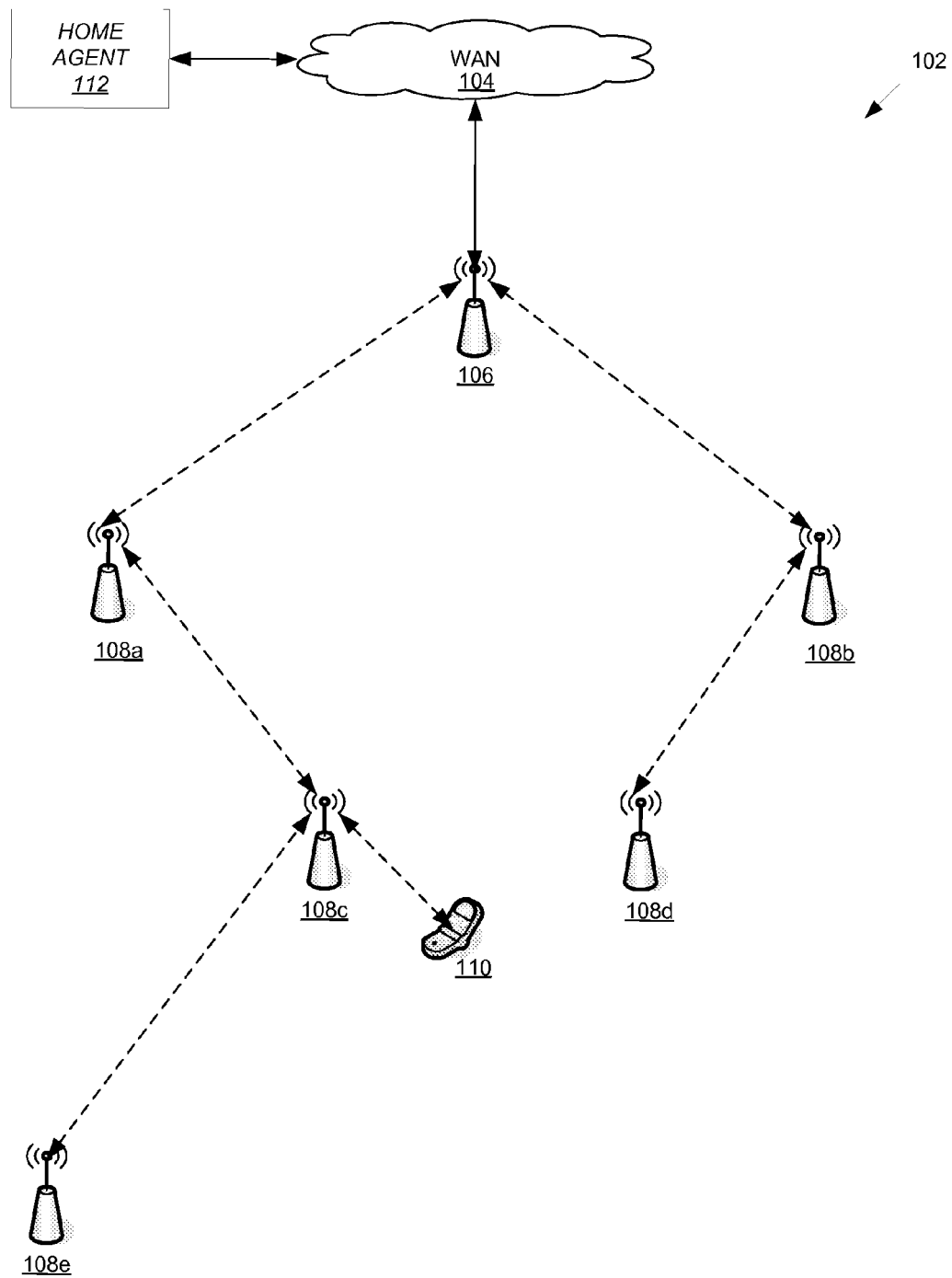
FIG. 1 is a conceptual block diagram illustrating an example of a cluster.

Various concepts presented throughout this disclosure may be utilized across a broad array of networks and communication protocols. One non-limiting example is shown in FIG. 1 where a cluster 102 is connected to a WAN 104. A "cluster" is formed by a number of nodes that join together to provide backhaul services to other nodes in the cluster. In a cluster, data is routed from one node to another until the data reaches its destination. The destination may be a WAN 104 as shown in FIG. 1, or another node in the same or different cluster. A cluster provides a continuous connection through one or more intermediates nodes and is dynamically reconfigurable to maintain a connection when one or more nodes in the cluster fails.

The cluster 102 in FIG. 1 is shown with a node 106 having a wired backhaul connection to the WAN 104 through a network router (not shown). This node 106 will be referred to as a "root access point" (RAP). In this example, the network router is integrated into the RAP 106, but alternatively, the network router may be separate from the RAP. The cluster 102 is shown with five additional nodes 108a-108e dispersed throughout the geographic coverage region, but may include any number of nodes depending on the geographic reach of the cluster 102. Each of these nodes will be referred to as a "wireless access point" (WAP) because of its wireless backhaul connection to another node in the cluster 102. Each WAP 108a-108e may be fixed or mobile. Each node in the cluster 102 may be referred to by those skilled in the art as an access point, NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal 110 moving through the cluster 102 may access the WAN 104 by establishing a radio link with any node in the cluster 102 (i.e., a RAP 106 or a WAP 108a-108e). The access terminal 110 may be any suitable mobile communications device, including by way of example, a mobile telephone, a personal digital assistant (PDA), a portable television, a personal computer, a laptop computer, a digital camera, a digital camcorder, a game console, a portable audio device, a portable radio, or any other suitable device capable of supporting a radio link with a node in the cluster 102. The access terminal 110 may be referred to by those skilled in the art as a handset, wireless communications device, user terminal, user equipment, mobile station, mobile unit, subscriber unit, subscriber station, mobile radio, radio telephone, wireless station, wireless device, or some other terminology. The various concepts described throughout this disclosure are intended to apply to all wireless communication devices regardless of their specific nomenclature.

The cluster 102 is formed by establishing radio links between the nodes. In the configuration shown in FIG. 1, a radio path is created between the RAP 106 and the access terminal 110 through two intermediate WAPs 108a and 108c. The radio path may be dynamically reconfigurable to provide a continuous connection to the WAN 104 for the access terminal 110. By way of example, a new radio path can be established between the RAP 106 and the access terminal 110 through intermediate WAPs 108b, 108d due to quality of service (QoS) requirements, load balancing, backhaul constraints, or the failure of intermediate WAP 108a or 108c. The ability to reconfigure the radio path also enables access terminal mobility. It allows the access terminal to maintain a continuous connection to the WAN 104 as it moves through the cluster 102. In the example illustrated in FIG. 1, a new radio path may be established between the RAP 106 and the access terminal 110 through intermediate WAPs 108b, 108d as the access terminal 110 moves from left to right across FIG. 1.

The radio links between the nodes may be supported using any wireless protocol. By way of example, the links may be implemented using World Interoperability for Microwave Access (WiMAX), infrared protocols such as Infrared Data Association (IrDA), Bluetooth, Ultra-Wide Band (UWB), Wireless Fidelity Alliance (Wi-Fi Alliance), UMTS, LTE, EV-DO, UMB or any other suitable protocol, or any combination thereof. The actual wireless protocol implemented in any particular cluster will depend on the specific application and the overall design constraints imposed on the overall system.

When the access terminal 110 initially comes on line, it will attempt to join the cluster 102 by decoding an acquisition signal, such as a beacon from a node (i.e., a WAP or RAP). In the example shown in FIG. 1, the access terminal decodes the acquisition signal from the WAP 108c. Once the access terminal 110 decodes an acquisition signal, it performs appropriate access operations to open a connection with the WAP 108c to support communications. Next, the access terminal 110 optionally registers with its home network by informing a home agent 112 of its whereabouts. The registration process may include various security features including authentication of the access terminal 110. Once the access terminal 110 is registered, it can negotiate a number of attributes that affect the characteristics of the connection and the service received by the RAP 106 and WAP 108c. This is generally referred to as the "session state." The session state may include such things as the quality of service (QoS) required by an application program running on the access terminal 110. By way of example, the application program may negotiate a certain priority for a data flow, or a guarantee of a certain level of performance, for example in terms of throughput and latency, for a new application program.

Figure 2:
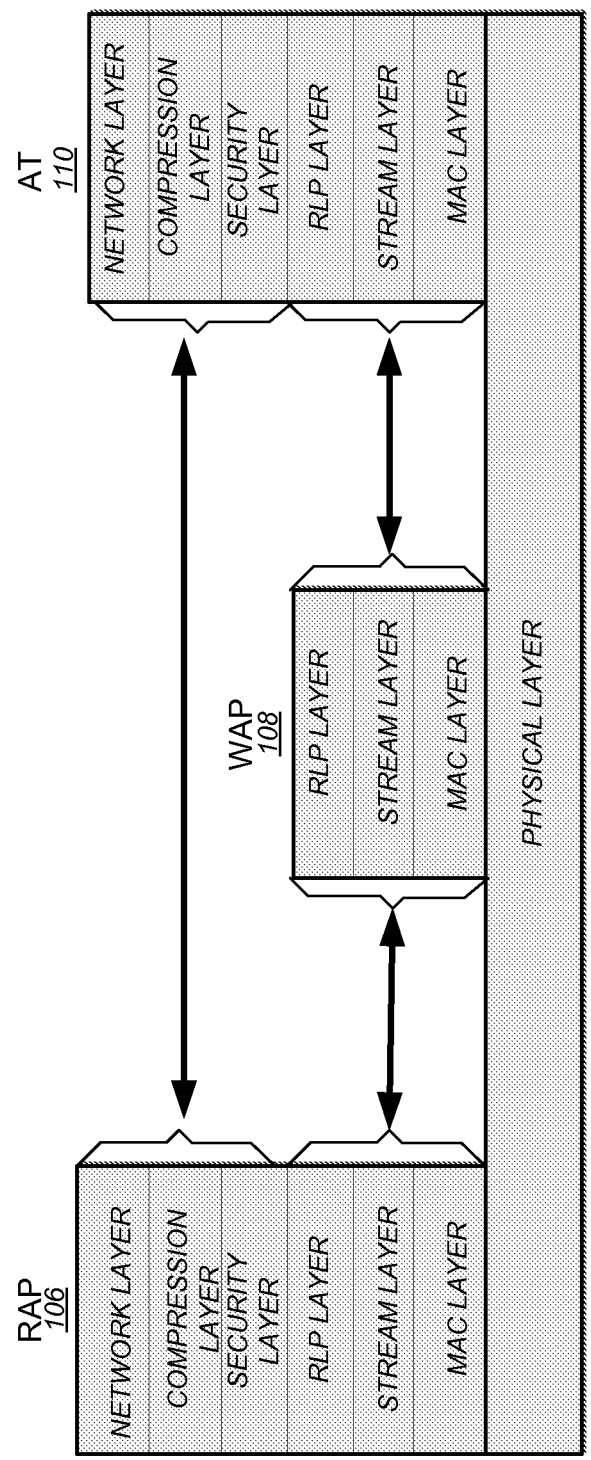
FIG. 2 is a diagram illustrating an example of a protocol stack for the cluster.

FIG. 2 is a diagram illustrating an example of a protocol stack for the cluster. In its simplest form, the protocol stack includes from top to bottom a network layer, a compression layer, a security layer, a Radio Link Protocol (RLP) layer, a stream layer, a Media Access Control (MAC) layer, and a physical layer.

The network layer is responsible for routing data between the source and destination. In this example, the network, compression, and security layers are connected between the RAP 106 and the access terminal 110. This configuration allows all network layer functionality to lie outside the WAPs in the cluster. In addition, header compression for data packets can be performed between the RAP 106 and the access terminal 110, thus conserving valuable bandwidth within the cluster. Finally, security protocols for secured network communications may also be performed between the RAP 106 and the access terminal 110, thus eliminating the need to manage encryption keys through the cluster.

The RLP, stream, and MAC layers are responsible for routing data between nodes in the cluster. These layers are generally associated with the data link layer in the seven level OSI model. The RLP layer frames the payload and ensures reliable delivery of data between nodes. The payload may contain data packets and controls, which may be fragmented and reassembled by the RLP layer on a node-by-node basis. The stream layer is used to assign each flow associated with an access terminal to a separate stream. By way of example, a user on an access terminal 110 may be browsing a web page while engaged in a voice call. In this example, the RAP 106 and the access terminal 110 may maintain separate streams for each, thus enabling separate session states with a higher QoS priority for the voice call than the web browser application. The MAC layer may be used for addressing and access to the physical layer. The physical layer is responsible for channel structure, frequency, power, modulation, and encoding.

For clarity of presentation, the term "packet" will be used to describe segments of data at the network layer and the term "frame" will be used to describe segments of data routed through the cluster. However, those skilled in the art will readily understand that in practical applications the terms are interchangeable and may also be referred to by other terms such as time slots, data bursts, or any other terms that refer to a segment of data.

In addition to header compression and security, it may be advantageous to perform other control functions between the RAP 106 and the access terminal 110. By way of example, the registration of the access terminal 110 for paging with the home network may be preformed between the access terminal 110 and the RAP 106. The negotiation of the session state is another example of function that may be performed between the RAP 106 and the access terminal 110. Other functions, such as opening a connection with a WAP 108, signaling acknowledgements and data flow reliability, may be performed at the data link layer (i.e., between the WAP 108 and the access terminal 110).

In one configuration, the cluster may be configured to support a split of control flow end-points based on the controls being sent. In this configuration, a set of streams may be designated to support controls between the WAP 108 and the access terminal 110, and another set of streams may be designated to support controls between the RAP 106 and the access terminal 110. As a result, certain controls will be sent directly between the WAP 108 and the access terminal 110, while other controls will be tunneled between the RAP 106 and the access terminal 110. The manner in which the controls are partitioned between the end-points for any particular network architecture will depend on certain performance tradeoffs, and those skilled in the art will be readily able to determine the appropriate partitioning for any particular network specification.

An attractive feature of using the stream layer to designate the end-points of the control flows is that it hides the network architecture and processing from the access terminal 110. By way of example, one skilled in the art may determine that it is advantageous to perform all data link layer control functions between the WAP 108 and the access terminal 110 to support a subsequent revision to the network specification or different deployment. In that case, all controls would be assigned to the set of flows between the WAP 108 and the access terminal 110. Also, using separate streams for controls has the advantage that the RAP 106 or WAP 108 does not need to look inside a stream to determine who should process the data or controls.

Figure 3:
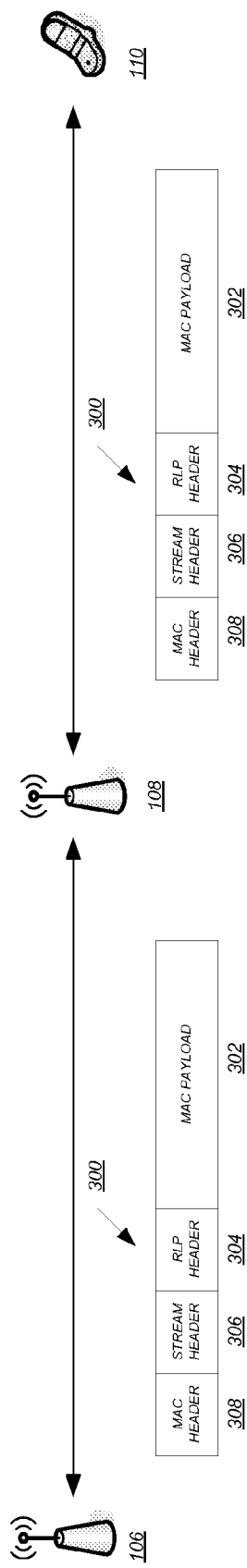
FIG. 3 is a conceptual diagram illustrating an example of the framing format for controls in the cluster.

FIG. 3 is a conceptual diagram illustrating an example of the framing format for controls in the cluster. In this example, a MAC frame 300 is shown routed between a RAP 106 and access terminal 110 through an intermediate WAP 108. The MAC frame 300 includes a MAC payload 302, which carries data or controls, or any portion thereof, between the RAP 106 and the access terminal 110. A RLP header 304 is attached to the MAC payload 302. The RLP header 304 may be used to ensure reliable delivery of the MAC frame on a node-by-node basis. The RLP header 304 may also be used for fragmentation and reassembly of the controls. Next, a stream header 306 is attached. The stream header 306 identifies the data or control flow (i.e., the end-points for the data or controls). In this example, the stream header 306 identifies the end-points for the data or controls as the RAP 106 and the access terminal 110. As a result, the WAP 108 simply tunnels the data or controls between the two end-points. Alternatively, the stream header 306 could identify the end-points for the data or controls as the WAP 108 and the access terminal 110. Finally, a MAC header 308 is attached for routing.

Figure 4:
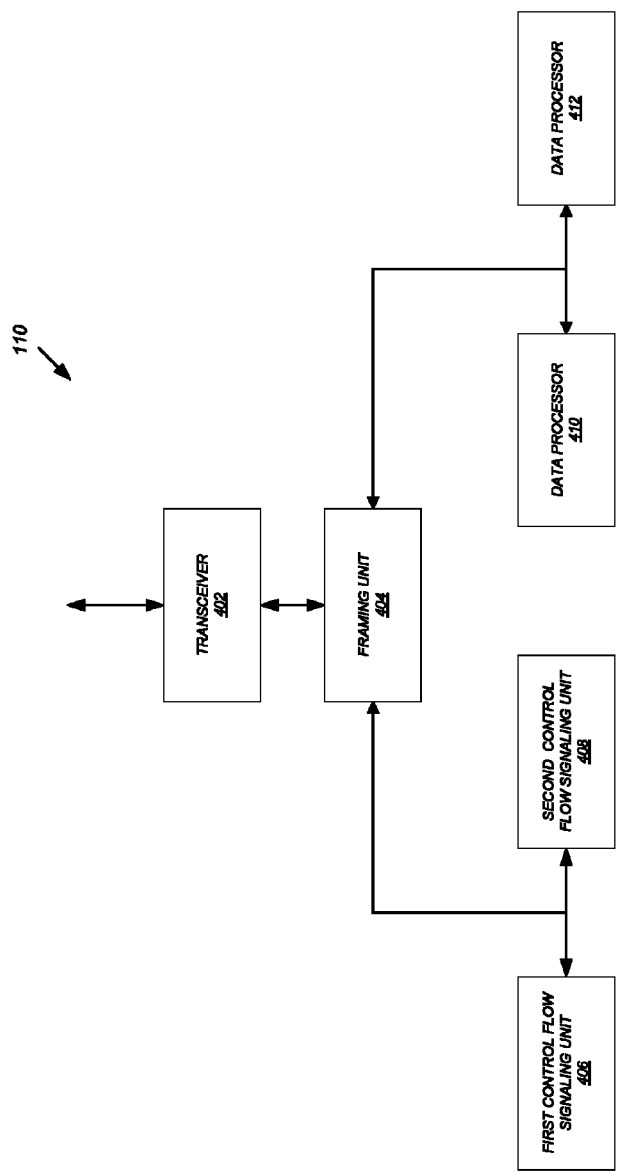
FIG. 4 is a functional block diagram illustrating an example of an access terminal.

FIG. 4 is a functional block diagram illustrating an example of an apparatus, such as an access terminal 110, although the same architecture may be used implement a RAP 106. The access terminal 110 includes a transceiver 402, a framing unit 404, a first control flow signaling unit 406, a second control flow signaling unit 408, and two data processors 410, 412, to support two traffic flows. In alternative configurations, the access terminal 110 may have any number of signaling units and data processors depending on the particular application and the overall design constraints imposed on the system. The signaling units and data processors may be separate entities as shown in FIG. 4, combined into one or more entities, or distributed across existing entities within the access terminal.

In the upstream direction, the framing unit 404 frames the controls from the first and second control flow WAP signaling units 406, 408 and traffic from the data processors 410, 412 for routing to a WAP in the cluster. In one non-limiting example, the framing unit 404 frames the controls and traffic into MAC payloads and attaches a RLP, stream, and MAC header to each. The output from the framing unit 404 is provided to the transceiver 402 for over-the-air transmission. As discussed earlier, the wireless interface may be configured to support various wireless protocols, including by way of example, WiMAX, infrared, Bluetooth, UMTS, LTE, EV-DO, UMB, Wi-Fi, or others.

In the downstream direction, the over-the-air transmission from a WAP in the cluster is received by the transceiver 402 and provided to the framing unit 404. The framing unit 404 processes the headers from the received frames, and based on the stream headers, provides the contents of the MAC payload to the first and second control flow signaling units 406, 408 and the data processors 410, 412.

The apparatus in shown in FIG. 4 may be implemented within or performed by an integrated circuit (IC), an access terminal, an access point, or other suitable entity. The IC, access terminal, access point, or other suitable entity may comprise a microprocessor, digital signal processor (DSP), or some other suitable platform capable of executing program code or code segments. A code segment may represent a procedure, a function, a subprogram, a program, a routine, a subroutine, a module, or any combination of instructions, data structures, or program statements. The program code or code segments may reside in computer readable media. The computer readable media may be a storage device, including by way of example, RAM memory, flash memory, ROM memory, EPROM memory, EEPROM memory, registers, hard disk, a removable disk, a CD-ROM, or any other form of storage media known in the art, or in IC applications, may reside on the IC. Computer readable media may also include a carrier wave that encodes a data signal.

As an alternative to a software implementation, or in addition to, the IC, access point, or other suitable entity may be implemented with an application specific integrated circuit (ASIC), a controller, microcontroller, a state machine, a field programmable gate array (FPGA) or other programmable logic component, discrete gate or transistor logic, discrete hardware components, or any combination thereof.

Those skilled in the art will recognize the interchangeability of hardware, firmware, and software configurations under these circumstances, and how best to implement the described functionality for each particular application.

Figure 5:
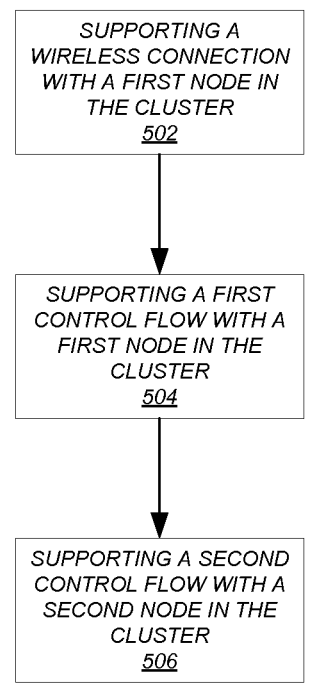
FIG. 5 is a flow chart illustrating an example of the operation of an access terminal.

FIG. 5 is a flow diagram illustrating an example of the operation of an access terminal. In step, 502, the access terminal supports a wireless connection with a first node in the cluster. In step 504, the access terminal supports a first control flow with the first node. In step 506, the access terminal supports a second control flow, through the first node, with a second node in the cluster. The first control flow comprises a plurality of frames each having a header identifying the first control flow, and the second control flow comprises a plurality of frames each having a header identifying the second control flow. The first control flow may be related to link layer functions, including by way of example, controls relating to data flow reliability. The second control flow may be related to other link layer functions, or higher layer functions, including by way of example, network layer functions, negotiation of session state, security, and quality of service (QoS) negotiations, and admission control.

Although the operation of the access terminal is described in FIG. 5 as a sequential process, any number of the steps can be performed in parallel or concurrently. In addition, the order of the steps may be re-arranged.

Figure 6:
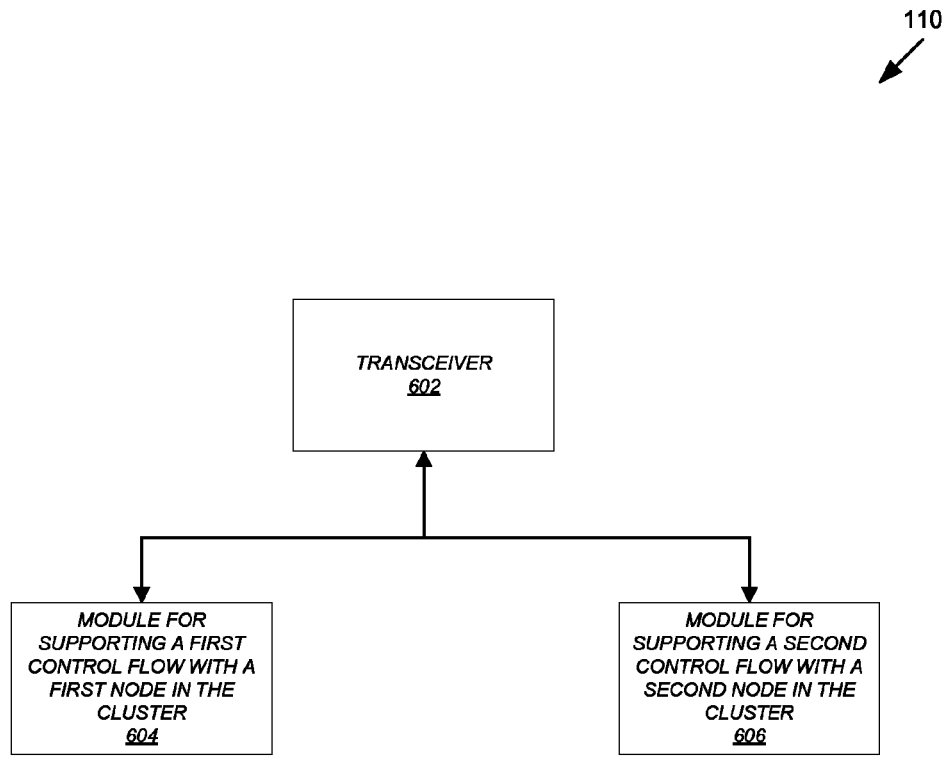
FIG. 6 is another functional block diagram illustrating an example of an access terminal.

FIG. 6 is a functional block diagram illustrating an example of an access terminal. The access terminal 110 includes a transceiver 602 for supporting a wireless connection with a first node in a cluster. The access terminal 110 also includes a module 604 for supporting a first control flow with the first node and a module 606 for supporting a second control flow, through the first node, with a second node in the cluster.

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, an access terminal may be configured to support a wireless connection with a first node in a cluster. The access terminal may also support a first control flow with a first node and second control flow, through the first node, with a second node in the cluster. The access terminal may also support one or more traffic flows. The manner in which the flows are identified may vary. By way of example, the flows may include frames, with each frame having a field and content. The field may be used to identify the flow to which that frame belongs. The functional partitioning of the control flows may be different from one configuration to another. By way of example, a first control flow may be related to link layer functions, including by way of example, controls relating to data flow reliability. A second control flow may be related to functions other than link layer functions, including by way of example, network layer functions, negotiation of session state, security, and quality of service (QoS) negotiations, and admission control.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for supporting wireless communications in a cluster comprising a plurality of wireless access points, each of which employs a wireless backhaul, the apparatus comprising:
a signaling unit configured to:
support a first control flow between the apparatus and a wireless access point in the cluster; and
support a second control flow between the apparatus and a node in the cluster, tunneled through the wireless access point,
wherein the first and second control flows are assigned to separate streams in a stream layer,
wherein the first and second control flows comprise a plurality of stream layer frames, each stream layer frame having a field and content,
wherein the field in each of the stream layer frames identifies whether the content in that stream layer frame is part of the first or second control flow,
wherein the field in each of the stream layer frames for the first control flow identifies the wireless access point as an endpoint for the first control flow,
wherein the field in each of the stream layer frames for the second control flow identifies the node as an endpoint for the second control flow, and
wherein the stream layer frames for the first control flow include controls relating to a first protocol layer, and the stream layer frames for the second control flow include controls relating to a second protocol layer.

2. The apparatus of claim 1 further comprising a data processor configured to support a traffic flow with the wireless access point.

3. The apparatus of claim 1 wherein the second control flow is related to at least one of a set of link layer functions and a set of functions other than link layer functions.

4. The apparatus of claim 1 wherein the first control flow includes controls relating to data flow reliability.

5. The apparatus of claim 1 wherein the second control flow is related to network layer functions.

6. The apparatus of claim 1 wherein the second control flow includes controls relating to negotiation of a session state.

7. The apparatus of claim 1 wherein the second control flow includes controls relating to security negotiations.

8. The apparatus of claim 1 wherein the second control flow includes controls relating to registration of the apparatus with the cluster.

9. The apparatus of claim 1 wherein the second control flow includes controls relating to admission control.

10. An apparatus for supporting wireless communications in a cluster comprising a plurality of wireless access points, each of which employs a wireless backhaul, the apparatus comprising:
  means for supporting a first control flow between the apparatus and a wireless access point in the cluster; and
  means for supporting a second control flow between the apparatus and a node in the cluster, tunneled through the wireless access point;
  wherein the first and second control flows are assigned to separate streams in a stream layer,
  wherein the first and second control flows comprise a plurality of stream layer frames, each stream layer frame having a field and content,
  wherein the field in each of the stream layer frames identifies whether the content in that stream layer frame is part of the first or second control flow,
  wherein the field in each of the stream layer frames for the first control flow identifies the wireless access point as an endpoint for the first control flow,
  wherein the field in each of the stream layer frames for the second control flow identifies the node as an endpoint for the second control flow, and
  wherein the stream layer frames for the first control flow include controls relating to a first protocol layer, and the stream layer frames for the second control flow include controls relating to a second protocol layer.

11. The apparatus of claim 10 further comprising means for supporting a traffic flow with the wireless access point.

12. The apparatus of claim 10 wherein the second control flow is related to at least one of a set of link layer functions and functions other than link layer functions.

13. The apparatus of claim 10 wherein the first control flow includes controls relating to data flow reliability.

14. The apparatus of claim 10 wherein the second control flow is related to network layer functions.

15. The apparatus of claim 10 wherein the second control flow includes controls relating to negotiation of a session state.

16. The apparatus of claim 10 wherein the second control flow includes controls relating to security negotiations.

17. The apparatus of claim 10 wherein the second control flow includes controls relating to registration of the apparatus with the cluster.

18. The apparatus of claim 10 wherein the second control flow includes controls relating to admission control.

19. A method of communications in a cluster comprising a plurality of wireless access points, each of which employs a wireless backhaul, the method comprising:
  supporting a wireless connection between an apparatus and a wireless access point in the cluster;
  supporting a first control flow between the apparatus and the wireless access point; and
  supporting a second control flow between the apparatus and a node in the cluster, tunneled through the wireless access point,
  wherein the first and second control flows are assigned to separate streams in a stream layer,
  wherein the first and second control flows comprise a plurality of stream layer frames, each stream layer frame having a field and content,
  wherein the field in each of the stream layer frames identifies whether the content in that stream layer frame is part of the first or second control flow,
  wherein the field in each of the stream layer frames for the first control flow identifies the wireless access point as an endpoint for the first control flow,
  wherein the field in each of the stream layer frames for the second control flow identifies the node as an endpoint for the second control flow, and
  wherein the stream layer frames for the first control flow include controls relating to a first protocol layer, and the stream layer frames for the second control flow include controls relating to a second protocol layer.

20. The method of claim 19 further comprising supporting a traffic flow with the wireless access point.

21. The method of claim 19 wherein the second control flow is related to at least one of a set of link layer functions and functions other than link layer functions.

22. The method of claim 19 wherein the first control flow includes controls relating to data flow reliability.

23. The method of claim 19 wherein the second control flow is related to network layer functions.

24. The method of claim 19 wherein the second control flow includes signaling relating to negotiation of a session state.

25. The method of claim 19 wherein the second control flow includes signaling relating to security negotiations.

26. The method of claim 19 wherein the second control flow includes controls relating to registration with the cluster.

27. The method of claim 19 wherein the second control flow includes controls relating to admission control.

28. An access terminal, comprising:
  a transceiver configured to support a wireless connection with a wireless access point in a cluster comprising a plurality of wireless access points, each of which employs a wireless backhaul; and
  a signaling unit configured to:
  support a first control flow between the access terminal and the wireless access point; and
  support a second control flow between the access terminal and a node in the cluster, tunneled through the wireless access point,
  wherein the first and second control flows are assigned to separate streams in a stream layer,
  wherein the first and second control flows comprise a plurality of stream layer frames, each stream layer frame having a field and content,
  wherein the field in each of the stream layer frames identifies whether the content in that stream layer frame is part of the first or second control flow,
  wherein the field in each of the stream layer frames for the first control flow identifies the wireless access point as an endpoint for the first control flow,
  wherein the field in each of the stream layer frames for the second control flow identifies the node as an endpoint for the second control flow, and
  wherein the stream layer frames for the first control flow include controls relating to a first protocol layer, and the stream layer frames for the second control flow include controls relating to a second protocol layer.

29. A wireless access point, comprising:
  a transceiver configured to support a wireless connection with a wireless access terminal in a cluster comprising a plurality of wireless access points, each of which employs a wireless backhaul; and a signaling unit configured to:
support a first control flow between the access terminal and the wireless access point; and
support a second control flow between the access terminal and a node in the cluster, tunneled through the wireless access point,
wherein the first and second control flows are assigned to separate streams in a stream layer,
wherein the first and second control flows comprise a plurality of stream layer frames, each stream layer frame having a field and content,
wherein the field in each of the stream layer frames identifies whether the content in that stream layer frame is part of the first or second control flow,
wherein the field in each of the stream layer frames for the first control flow identifies the wireless access point as an endpoint for the first control flow,
wherein the field in each of the stream layer frames for the second control flow identifies the node as an endpoint for the second control flow, and
wherein the stream layer frames for the first control flow include controls relating to a first protocol layer, and the stream layer frames for the second control flow include controls relating to a second protocol layer.

30. A computer program product, comprising:
a non-transitory computer-readable storage device comprising code executable by at least one computer to:
support a wireless connection between an apparatus and a wireless access point in a cluster comprising a plurality of wireless access points, each of which employs a wireless backhaul;
support a first control flow between the apparatus and the wireless access point; and
support a second control flow between the apparatus and a node in the cluster, tunneled through the wireless access point;
wherein the first and second control flows are assigned to separate streams in a stream layer,
wherein the first and second control flows comprise a plurality of stream layer frames: each stream layer frame having a field and content,
wherein the field in each of the stream layer frames identifies whether the content in that stream layer frame is part of the first or second control flow, and
wherein the field in each of the stream layer frames for the first control flow identifies the wireless access point as an endpoint for the first control flow,
wherein the field in each of the stream layer frames for the second control flow identifies the node as an endpoint for the second control flow, and
wherein the stream layer frames for the first control flow include controls relating to a first protocol layer, and the stream layer frames for the second control flow include controls relating to a second protocol layer.

31. The apparatus of claim 1, wherein the first control flow includes controls for performing control functions between the apparatus and the wireless access point, and the second control flow includes controls for performing control functions between the apparatus and the node.

32. The apparatus of claim 31, wherein the control functions between the apparatus and the node include control functions relating to at least one of session state negotiations between the apparatus and the node and security negotiations between the apparatus and the node.

33. The apparatus of claim 31, wherein the control functions between the apparatus and the wireless access point include control functions relating to at least one of data flow reliability and signal acknowledgements between the apparatus and the wireless access point.

34. The apparatus of claim 1, wherein the first protocol layer is lower than the second protocol layer.

35. The apparatus of claim 34, wherein the first protocol layer comprises at least one of a radio link protocol layer, a media access control layer and a physical layer, and the second protocol layer comprises at least one of a network layer and a compression layer.

36. The apparatus of claim 1, wherein the stream assigned to the first control flow is between the apparatus and the wireless access point and the stream assigned to the second control flow is between the apparatus and the node.

37. The apparatus of claim 1, wherein the first protocol layer comprises a radio link protocol layer.

* * * * *